(12) United States Patent
Jones (10) Patent No.: US 11,256,789 B2
(45) Date of Patent: Feb. 22, 2022

(54) RECURRING TOKEN TRANSACTIONS

(71) Applicant: Visa International Service Association, San Francisco, CA (US)

(72) Inventor: Christopher Jones, Greenbrae, CA (US)

(73) Assignee: Visa International Service Association, San Francisco, CA (US)

( * ) Notice: Subject to any disclaimer, the term of this patent is extended or adjusted under 35 U.S.C. 154(b) by 223 days.

(21) Appl. No.: 16/444,339

(22) Filed: Jun. 18, 2019

(65) Prior Publication Data

US 2019/0384896 A1    Dec. 19, 2019

Related U.S. Application Data (60) Provisional application No. 62/686,381, filed on Jun. 18, 2018.

(51) Int. Cl.
  *G06F 21/31*   (2013.01)
  *G06F 21/60*   (2013.01)

(52) U.S. Cl.
  CPC ............ *G06F 21/31* (2013.01); *G06F 21/602* (2013.01)

(58) Field of Classification Search
  CPC ................................ G06F 21/31; G06F 21/602
  See application file for complete search history.

(56) References Cited

U.S. PATENT DOCUMENTS

| | | |
|---|---|---|
| 5,280,527 A | 1/1994 | Gullman |
| 5,613,012 A | 3/1997 | Hoffman |

(Continued)

FOREIGN PATENT DOCUMENTS

| | | |
|---|---|---|
| EP | 1028401 A2 | 8/2000 |
| EP | 2156397 A1 | 2/2010 |

(Continued)

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

(Continued)

*Primary Examiner* — Tongoc Tran
(74) *Attorney, Agent, or Firm* — Kilpatrick Townsend & Stockton LLP (57) ABSTRACT

A method is disclosed. The method includes receiving a communication comprising a real credential from a communication device and providing the real credential to a token computer. The token computer generates a token and a cryptogram, and the cryptogram is formed using a resource provider initiated transaction indicator. The method includes receiving, from the token computer, the token and the cryptogram, and transmitting, to a processing computer, an authorization request message comprising the token, the cryptogram, a resource provider identifier, and a transaction amount for a first transaction. The processing computer validates the cryptogram, exchanges the token for the real credential, stores the resource provider identifier, and forwards the authorization request message including the real credential, and the transaction amount to an authorizing entity computer. The method also includes receiving an authorization response message from the authorizing entity computer.

18 Claims, 5 Drawing Sheets

(56) References Cited

U.S. PATENT DOCUMENTS

| | | |
|---|---|---|
| 5,781,438 A | 7/1998 | Lee |
| 5,883,810 A | 3/1999 | Franklin |
| 5,930,767 A | 7/1999 | Reber |
| 5,953,710 A | 9/1999 | Fleming |
| 5,956,699 A | 9/1999 | Wong |
| 6,000,832 A | 12/1999 | Franklin |
| 6,014,635 A | 1/2000 | Harris |
| 6,044,360 A | 3/2000 | Picciallo |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem Ur |
| 6,453,301 B1 | 9/2002 | Niwa |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | DeMello |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,132,723 B2 | 3/2012 | Hogg et al. |
| 8,171,525 B1 | 5/2012 | Pelly |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,433,116 B2 | 9/2013 | Davis et al. |
| 8,528,067 B2 | 9/2013 | Hurry et al. |
| 8,533,860 B1 | 9/2013 | Grecia |
| 8,538,845 B2 | 9/2013 | Liberty |
| 8,555,079 B2 | 10/2013 | Shablygin |

(56) References Cited

U.S. PATENT DOCUMENTS

| | | |
|---|---|---|
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,751,642 B2 | 6/2014 | Vargas |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,646,303 B2 | 5/2017 | Karpenko |
| 9,680,942 B2 | 6/2017 | Dimmick |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0236632 A1 | 11/2004 | Maritzen |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 * | 4/2010 | Kloster ............... G06Q 20/04 705/44 |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |

(56) References Cited

U.S. PATENT DOCUMENTS

| | | |
|---|---|---|
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143754 A1 | 6/2012 | Patel |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191227 A1 | 7/2013 | Pasa et al. |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226802 A1 | 8/2013 | Hammad |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |

(56) References Cited

U.S. PATENT DOCUMENTS

| | | |
|---|---|---|
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0143146 A1* | 5/2014 | Ha .................... G06Q 20/3821 705/44 |
| 2014/0164243 A1 | 6/2014 | Aabye et al. |
| 2014/0188586 A1 | 7/2014 | Carpenter et al. |
| 2014/0249945 A1 | 9/2014 | Gauthier |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2014/0372322 A1* | 12/2014 | Tieken .................. G06Q 20/385 705/75 |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1* | 1/2015 | Dill .................... G06Q 20/40 705/44 |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0058227 A1* | 2/2015 | Dua .................... G06Q 20/385 705/67 |
| 2015/0081544 A1 | 3/2015 | Wong et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1* | 6/2015 | Wong .................... G06Q 20/327 713/172 |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0278799 A1 | 10/2015 | Palanisamy |
| 2015/0287037 A1 | 10/2015 | Salmon |
| 2015/0312038 A1 | 10/2015 | Palanisamy |
| 2015/0319158 A1 | 11/2015 | Kumnick |
| 2015/0324736 A1 | 11/2015 | Sheets |
| 2015/0332262 A1 | 11/2015 | Lingappa |
| 2015/0339664 A1 | 11/2015 | Wong et al. |
| 2015/0356560 A1 | 12/2015 | Shastry et al. |
| 2015/0363781 A1 | 12/2015 | Badenhorst |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0092874 A1 | 3/2016 | O'Regan |
| 2016/0103675 A1 | 4/2016 | Aabye et al. |
| 2016/0119296 A1 | 4/2016 | Laxminarayanan et al. |
| 2016/0132878 A1 | 5/2016 | O'Regan |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0197725 A1 | 7/2016 | Hammad |
| 2016/0210628 A1 | 7/2016 | McGuire |
| 2016/0217452 A1 | 7/2016 | Wong et al. |
| 2016/0217461 A1 | 7/2016 | Gaddam |
| 2016/0218875 A1 | 7/2016 | Le Saint et al. |
| 2016/0224976 A1 | 8/2016 | Basu |
| 2016/0224977 A1 | 8/2016 | Sabba et al. |
| 2016/0232527 A1 | 8/2016 | Patterson |
| 2016/0239842 A1 | 8/2016 | Cash et al. |
| 2016/0269391 A1 | 9/2016 | Gaddam et al. |
| 2016/0308995 A1 | 10/2016 | Youdale et al. |
| 2017/0046696 A1 | 2/2017 | Powell et al. |
| 2017/0076288 A1 | 3/2017 | Awasthi |
| 2017/0103387 A1 | 4/2017 | Weber |
| 2017/0109745 A1 | 4/2017 | Al-Bedaiwi |
| 2017/0148013 A1 | 5/2017 | Rajurkar |
| 2017/0161701 A1* | 6/2017 | Amancherla ........ G07F 17/3244 |
| 2017/0163617 A1 | 6/2017 | Narayan |
| 2017/0163629 A1 | 6/2017 | Law |
| 2017/0186001 A1 | 6/2017 | Reed et al. |
| 2017/0200156 A1 | 7/2017 | Karpenko |
| 2017/0200165 A1 | 7/2017 | Narayan |
| 2017/0201520 A1 | 7/2017 | Chandoor |
| 2017/0220818 A1 | 8/2017 | Nagasundaram et al. |
| 2017/0221054 A1 | 8/2017 | Flurscheim |
| 2017/0221056 A1 | 8/2017 | Karpenko |
| 2017/0228723 A1 | 8/2017 | Taylor |
| 2017/0236113 A1 | 8/2017 | Chitalia |
| 2017/0255932 A1 | 9/2017 | Aabye et al. |
| 2017/0293914 A1 | 10/2017 | Girish |
| 2017/0295155 A1 | 10/2017 | Wong et al. |
| 2017/0364903 A1 | 12/2017 | Lopez |
| 2017/0364914 A1 | 12/2017 | Howard |
| 2017/0373852 A1 | 12/2017 | Cassin |
| 2018/0006821 A1 | 1/2018 | Kinagi |
| 2018/0075081 A1 | 3/2018 | Chipman |
| 2018/0232722 A1 | 8/2018 | Wong et al. |
| 2018/0247303 A1 | 8/2018 | Raj |
| 2018/0262334 A1 | 9/2018 | Hammad |
| 2018/0268399 A1 | 9/2018 | Spector |
| 2018/0268405 A1 | 9/2018 | Lopez |
| 2018/0268411 A1* | 9/2018 | Voldman ............ G06Q 20/4018 |
| 2018/0285875 A1 | 10/2018 | Law |
| 2018/0324184 A1 | 11/2018 | Kaja |
| 2018/0324584 A1 | 11/2018 | Lopez |
| 2019/0020478 A1 | 1/2019 | Girish |
| 2019/0066069 A1 | 2/2019 | Faith |
| 2019/0130384 A1* | 5/2019 | Shauh .................. G06Q 20/401 |
| 2019/0147439 A1 | 5/2019 | Wang |
| 2019/0197548 A1* | 6/2019 | Kelly-Frank ........ G06Q 20/382 |
| 2019/0213589 A1 | 7/2019 | Aabye et al. |
| 2019/0342295 A1* | 11/2019 | Peterson ............ G06Q 20/3821 |
| 2020/0126072 A1* | 4/2020 | Karaivanov ......... G06Q 20/065 |
| 2020/0322350 A1* | 10/2020 | Mccarter ............... H04L 9/3231 |

FOREIGN PATENT DOCUMENTS

| | | |
|---|---|---|
| WO | 2000/014648 A1 | 3/2000 |
| WO | 2001035304 A1 | 5/2001 |

(56) References Cited

FOREIGN PATENT DOCUMENTS

| WO | 2001035304 | A9 | 5/2001 |
| WO | 2004/051585 | A2 | 11/2003 |
| WO | 2004042536 | A2 | 5/2004 |
| WO | 2005/001751 | A1 | 6/2004 |
| WO | 2006113834 | A2 | 10/2006 |
| WO | 2009032523 | A1 | 3/2009 |
| WO | 2010078522 | A1 | 7/2010 |
| WO | 2012068078 | A2 | 5/2012 |
| WO | 2012098556 | A1 | 7/2012 |
| WO | 2012142370 | A2 | 10/2012 |
| WO | 2012167941 | A1 | 12/2012 |
| WO | 2013048538 | A1 | 4/2013 |
| WO | 2013056104 | A1 | 4/2013 |
| WO | 2013119914 | A1 | 8/2013 |
| WO | 2013179271 | A2 | 12/2013 |

OTHER PUBLICATIONS

Dean, et al., U.S. Appl. No. 16/311,144 (unpublished), "Encryption Key Exhange Process Using Access Device," filed Dec. 18, 2018.
Kang, et al., U.S. Appl. No. 16/347,175 (unpublished), "Access Identifier Provisioning to Application," filed May 2, 2019.
Palanisamy, et al., U.S. Appl. No. 16/415,360 (unpublished), "Method and System for Access Token Processing," filed May 17, 2019.

* cited by examiner

RECURRING TOKEN TRANSACTIONS

CROSS-REFERENCE TO RELATED APPLICATIONS

This application is a non-provisional application of and claims priority to U.S. Provisional Application No. 62/686,381, filed on Jun. 18, 2018, which is herein incorporated by reference in its entirety for all purposes.

BACKGROUND

Tokens are used in transactions to access resources such as goods, data, or secure locations. A token can be a substitute for a real credential such as a real account identifier, and can provide data security by protecting the real credential. If the token is stolen by a man-in-the-middle or a hacker, the real credential is protected from unauthorized use.

In some cases, an additional piece of data such as a dynamic cryptogram must accompany the token in order for the token to be used. That is, for each transaction that uses a token, a user (or a communication device or resource provider acting on behalf of the user) needs to request a new cryptogram for the token from a token computer. The new cryptogram needs to accompany the token when the token is used in a transaction. Such cryptograms may be characterized as being "dynamic cryptograms," since they are changed frequently or for every transaction.

Using a new cryptogram with every token transaction improves data security relative to situations where only tokens are used to conduct transactions. If the new cryptogram is not present in an authorization request message in a transaction, then it will be declined since a valid cryptogram does not accompany the token.

Although the use of dynamic cryptograms for transactions is effective, improvements could made. For example, not all types of transactions are suitable for use with dynamic cryptograms. As an illustration, an interaction such as a recurring payment transaction conducted using an application on a user's mobile phone may not be capable of requesting a cryptogram each time a payment is made using the application. For example, as noted above, a dynamic cryptogram may only be generated when a user initiates a transaction. In this case, a token computer may only provide a cryptogram to a token holder (e.g., the user that is conducting the transaction) if it can perform some basic level of authentication (e.g., checking a device ID of the communication device requesting the cryptogram, or requesting a password from the token holder) of the token holder. However, in the case of a recurring payment, the merchant, and not the user, is requesting payment. The merchant is unable to request a dynamic cryptogram, because the merchant is not the token holder.

One way has been developed to circumvent the requirement of having a dynamic cryptogram accompany a token in every authorization request message from a recurring merchant. After an initial transaction is conducted with a merchant that conducts recurring transactions, a transaction identifier can be provided to the merchant or the merchant's acquirer from an issuer or a payment processing network. The merchant or the merchant's acquirer must then re-submit the transaction identifier along with future authorization requests for transactions that are not initiated by the user. A processing computer that receives the authorization request messages with the transaction identifier may use the transaction identifier as proof that the transaction is being conducted on behalf of a recurring merchant that was authorized to submit authorization request messages for transactions not initiated by the user.

Unfortunately, this solution does not work that well, because many merchant and acquirer systems are not equipped to store and re-transmit transaction identifiers in authorization request messages. In order for such systems to work, each and every merchant and/or merchant's acquirer needs to modify their systems in order to accommodate the storage and processing of transaction identifiers. This is burdensome, and it is difficult to achieve universal adoption of the solution.

Embodiments of the invention address these and other problems, individually and collectively.

SUMMARY

One embodiment of the invention is includes a method comprising: receiving, by a resource provider computer, a communication comprising a real credential from a communication device; providing, by the resource provider computer, the real credential to a token computer, wherein the token computer generates a token and a cryptogram, and wherein the cryptogram is formed using a resource provider initiated transaction indicator; receiving, by the resource provider computer from the token computer, the token and the cryptogram; transmitting, by the resource provider computer to a processing computer, an authorization request message comprising the token, the cryptogram, a resource provider identifier, and a transaction amount for a first transaction, wherein the processing computer validates the cryptogram, exchanges the token for the real credential, stores the resource provider identifier, and forwards the authorization request message including the real credential, and the transaction amount to an authorizing entity computer; and receiving, by the resource provider computer, an authorization response message from the authorizing entity computer.

Another embodiment of the invention includes a method comprising: receiving, by a token computer, a communication comprising a real credential from a communication device for a transaction conducted with a resource provider computer; obtaining, by the token computer, a token and a cryptogram, wherein the cryptogram is formed using a resource provider initiated transaction indicator; receiving, by the token computer, a request to exchange the token with the real credential from a processing computer; and transmitting, by the token computer, a response including the token to the processing computer, wherein the processing computer exchanges the token with the real credential in an authorization request message from the resource provider computer, the authorization request message including the real credential and a transaction amount, and processes the authorization request message.

Other embodiments include a computer comprising: a processor; and a computer readable medium coupled to the processor, the computer readable medium comprising code, executable by the processor, for performing the above-described methods.

These and other embodiments of the invention are described in further detail below.

DETAILED DESCRIPTION

Embodiments of the present invention are directed to methods and systems that can simplify transactions.

A "communication device" may comprise any suitable electronic device that may be operated by a user, which may also provide remote communication capabilities to a network. A "mobile communication device" may be an example of a "communication device" that can be easily transported. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile communication devices include mobile phones (e.g. cellular phones), PDAs, tablet computers, net books, laptop computers, personal music players, hand-held specialized readers, etc. Further examples of mobile communication devices include wearable devices, such as smart watches, fitness bands, ankle bracelets, rings, earrings, etc., as well as automobiles with remote communication capabilities. In some embodiments, a mobile communication device can function as a payment device (e.g., a mobile communication device can store and be able to transmit payment credentials for a transaction).

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of payment devices include payment cards, smart media, transponders, and the like. If the payment device is in the form of a debit, credit, or smartcard, the payment device may also optionally have features such as magnetic stripes. Such devices can operate in either a contact or contactless mode.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials (e.g., payment credentials), identification cards, certified documents, access cards, passcodes and other login information, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, and verification values such as CVV, dCVV, CVV2, dCVV2, and CVC3 values.

A "digital wallet" can include an electronic device that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a payment token may include a series of alphanumeric characters that may be used as a substitute for an original account identifier. For example, a token "4900 0000 0000 0001" may be used in place of a PAN "4147 0900 0000 1234." In some embodiments, a payment token may be "format preserving" and may have a numeric format that conforms to the account identifiers used in existing transaction processing networks (e.g., ISO 8583 financial transaction message format). In some embodiments, a payment token may be used in place of a PAN to initiate, authorize, settle or resolve a payment transaction or represent the original credential in other systems where the original credential would typically be provided. In some embodiments, a payment token may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token).

A "token issuer," token provider" or "token service system" can include a system that services tokens. It may operate a token computer. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of payment transactions submitted using tokens by de-tokenizing the tokens to obtain the actual PANs. In some embodiments, a token service system may include a tokenization computer alone, or in combination with other computers such as a transaction processing computer. Various entities of a tokenization ecosystem may assume the roles of the token service provider. For example, payment networks and issuers or their agents may become the token service provider by implementing the token services according to embodiments.

A "token domain" may indicate an area and/or circumstance in which a token can be used. Examples of token domains may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service provider to enforce appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

A "token expiry date" may refer to the expiration date/time of the token. The token expiry date may be passed among the entities of the tokenization ecosystem during transaction processing to ensure interoperability. The token expiration date may be a numeric value (e.g., a 4-digit numeric value). In some embodiments, the token expiry date can be expressed as a time duration as measured from the time of issuance.

A "token request message" may be an electronic message for requesting a token. A token request message may include information usable for identifying a payment account or digital wallet, and/or information for generating a payment token. For example, a token request message may include payment credentials, mobile device identification information (e.g., a phone number or MSISDN), a digital wallet identifier, information identifying a tokenization service provider, a merchant identifier, a cryptogram, and/or any other suitable information. Information included in a token request message can be encrypted (e.g., with an issuer-specific key).

A "token response message" may be a message that responds to a token request. A token response message may include an indication that a token request was approved or denied. A token response message may also include a token, mobile device identification information (e.g., a phone number or MSISDN), a digital wallet identifier, information identifying a tokenization service provider, a merchant identifier, a cryptogram, and/or any other suitable information. Information included in a token response message can be encrypted (e.g., with an issuer-specific key).

A "token requestor identifier" may include any characters, numerals, or other identifiers associated with an entity associated with a network token system. For example, a token requestor identifier may be associated with an entity that is registered with the network token system. In some embodiments, a unique token requestor identifier may be assigned for each domain for a token request associated with the same token requestor. For example, a token requestor identifier can identify a pairing of a token requestor (e.g., a mobile device, a mobile wallet provider, etc.) with a token domain (e.g., e-commerce, contactless, etc.). A token requestor identifier may include any format or type of information. For example, in one embodiment, the token requestor identifier may include a numerical value such as a ten digit or an eleven digit number (e.g., 4678012345).

A "user" may include an individual. In some embodiments, a user may be associated with one or more personal accounts and/or mobile devices. The user may also be referred to as a cardholder, account holder, or consumer in some embodiments.

A "resource provider" may be an entity that can provide a resource such as goods, services, information, and/or access. Examples of resource providers includes merchants, data providers, transit agencies, governmental entities, venue and dwelling operators, etc.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc.

An "issuer" may typically refer to a business entity (e.g., a bank) that maintains an account for a user. An issuer may also issue payment credentials stored on a communication device, such as a cellular telephone, smart card, tablet, or laptop to the consumer.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

Figure 1:
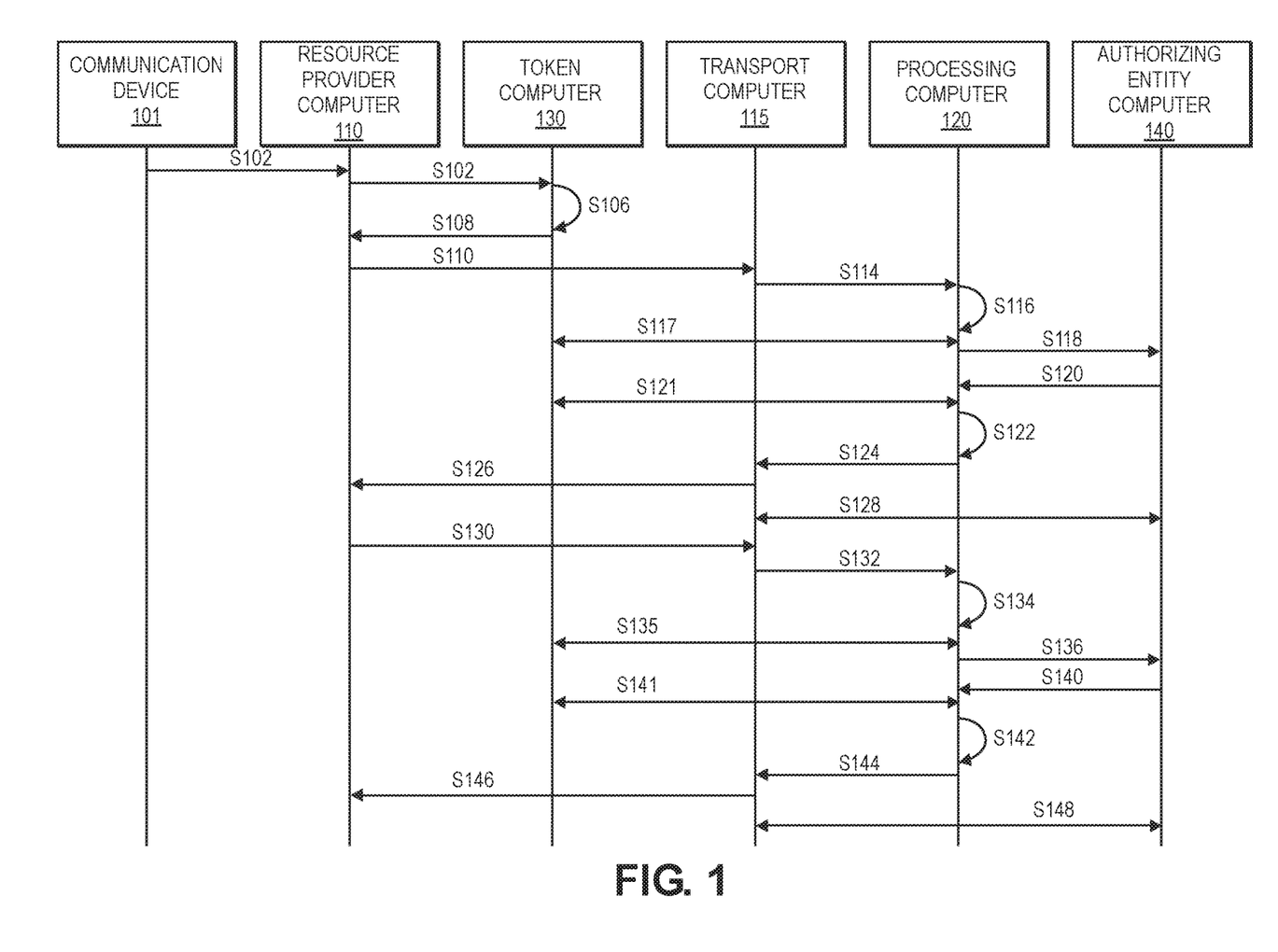
FIG. 1 shows a block diagram of a system according to an embodiment. A process flow is also illustrated.

A method and system according to an embodiment of the invention can be described with reference to FIG. 1. FIG. 1 shows a communication device 101 (e.g., a computer or mobile phone used by a user such as a consumer) in operative communication with a resource provider computer 110. The resource provider computer 110 (e.g., a merchant computer) can be operated by a resource provider, and can communicate with a token computer 130, a transport computer 115 (e.g., an acquirer computer), a processing computer 120 (e.g., a computer in a payment processing network), and an authorizing entity computer 140 (e.g., an issuer computer).

Each of the entities in FIG. 1 may communicate through any suitable communication channel or communications network. A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

In step S102, a resource provider computer 110 receives a communication comprising a real credential such as a real account identifier (e.g., a PAN or a primary account number) and an indication that recurring transactions will be conducted with the real account identifier, from a communication device 101. The indication may be formed in response to a user selecting a button on a Website or application hosted by the resource provider associated with the resource provider computer 110. By selecting the button, the user agrees to allow the resource provider associated with the resource provider computer 110 to make future payments on a recurring basis using the real account identifier (or token based upon the real account identifier) on behalf of the user. For example, the user of the communication device 101 may wish to purchase a recurring video subscription from the resource provider computer 110 (e.g., a recurring video subscription service such as Netflix™) using an application on the communication device 101. When the user enters her credit card number into the application, the user may be prompted to allow the resource provider to conduct future transactions for the user without the user's involvement. A button may be provided on the application, and the user can agree to this by selecting the button.

In step S104, after receiving the communication comprising the real account identifier and the indication that recurring transactions will be conducted with the real account identifier, the resource provider computer 110 can transmit a token request message for a token to the token computer 130 to request a token to process an initial payment for the requested resource. In some embodiments, the resource provider computer 110 may interact with the token computer 130 through a dedicated API or through a resource locator such as a URL.

In step S106, the token computer 130 may obtain (e.g., generate or retrieve) the token and a cryptogram for the resource provider computer 110. The token may be obtained in any suitable manner. In some embodiments, a token may be obtained by using various inputs (e.g., the real account identifier) and a mathematical function. In other embodiments, tokens may be preformed (and may not be mathematically derived from a real account identifier) and may be stored in a database. A token may be obtained by selecting a pre-existing token from the database.

The cryptogram may be generated by encrypting certain data using a cryptographic key (e.g., a symmetric key). An algorithm based on a scheme such as DES, triple DES, or AES may be used to form the cryptogram. In this case, since the resource computer 110 has indicated that recurring transactions will be conducted with the real account identifier, the data that is encrypted can include a "future MIT indicator" or generically a "resource provider initiated transaction indicator." Other types of token requests from merchants that do not conduct recurring payment transactions would not include the resource provider initiated transaction indicator in the cryptogram.

Other data may also be encrypted along with the resource provider initiated transaction indicator in the cryptogram. Such other data may include static data such as the token, the real credential, and/or a device identifier associated with the communication device 101. Other data may also include dynamic data such as counters, the time of day, etc. In some embodiments, dynamic data, static data, and the resource provider initiated transaction indicator, or portions thereof, may be concatenated (and also possibly truncated or modified), and then encrypted using an encryption algorithm and an appropriate cryptographic key. The cryptographic key may be a symmetric key of a key pair. In some embodiments, the other key of the key pair may be held by the processing computer 120, which may validate the cryptogram during a transaction.

In step S108, after the token computer 130 obtains the token and the cryptogram, the token computer 130 provides (e.g., transmits) the token and the cryptogram to the resource provider computer 110.

In steps S110 and S114, after receiving the token and the cryptogram from the token computer 130, the resource provider computer 110 then generates and transmits an authorization request message comprising at least the token, the cryptogram, a resource provider identifier, and a transaction amount for a first transaction to the processing computer 120 via the transport computer 115. The cryptogram may be present in a cryptogram data field in the authorization request message. The transport computer 115 may be an acquirer computer. Other data that may be in the authorization request message may be an acquirer identifier (e.g., an acquirer BIN or bank identification number) and/or acceptor identifier.

In step S116, after receiving the authorization request message, the processing computer 120 validates the cryptogram, and then stores the resource provider identifier, the resource provider initiated transaction indicator, and optionally the token (or its corresponding real account identifier) in a database. Other information that may be stored along with the resource provider identifier in the data that may be obtained from the authorization request message or from some other source may include an acquirer BID (bank ID), and a card acceptor ID. The validation of the cryptogram may include decrypting the cryptogram using an appropriate cryptographic key to obtain the inputs to the cryptogram, where the inputs may include the resource provider initiated transaction indictor and other information in the cryptogram. The processing computer 120 may recognize the presence of the resource provider initiated transaction indictor, and may recognize that the resource provider computer 110 should thereafter be designated as a one which will submit recurring authorization request messages on behalf of the user of the communication device 101 without any involvement of the user of the communication device 101.

The cryptographic key that is used to decrypt the cryptogram may be one key of a key pair. The other key of the key pair may be shared with the token computer 130 and may have been used to form the cryptogram. The cryptographic keys may be symmetric keys that may be independently generated by the token computer 130 and the processing computer 120 using shared secrets and algorithms. Alternatively, the token computer 130 could generate a symmetric key and may deliver the corresponding symmetric key to the processing computer 120 (using secure key delivery methods), or vice-versa.

After the processing computer 120 has validated the cryptogram, in step S117, it may then obtain the real account identifier from the token computer 130. The processing computer 120 may transmit a detokenization request message including the token to the token computer 130. The token computer 130 may then search a database for the real account identifier using the token, and may transmit a detokenization response message including the real account identifier back to the processing computer 120.

In step S118, the processing computer 120 modifies the authorization request message to include the real account identifier, and then forwards the authorization request message including at least the real account identifier and the transaction amount to the authorizing entity computer 140. The authorizing entity computer 140 may then evaluate the authorization request message and may then generate an authorization response message indicating that the transaction is either approved or declined.

In step S120, the authorization response message is transmitted by the authorizing entity computer 140 to the processing computer 120. In step S121, the processing computer 120 can communicate with the token computer 130 to exchange the real account identifier for the token. In step S122, the processing computer 120 can modify the authorization response message to include the token instead of the real account identifier. In steps S124 and S126, the processing computer 120 may forward the authorization response message with the token to the resource provider computer via the transport computer 116. In step S128, a clearing and settlement process can occur at a later time between the transport computer 115, the processing computer 120, and the authorizing entity computer 140.

At some later point in time, a second transaction may be initiated by the resource provider computer 110 without requiring any action on the part of the user of the communication device 101. This might occur, for example, if the second transaction is a recurring payment transaction (e.g., for a subscription service) that is initiated by the resource provider computer 110 (or a resource provider application on the communication device 101), and not the user of the communication device 101.

In step S130, the resource provider computer 110 generates a second authorization request message comprising at least the token, a transaction amount, and a resource provider identifier without interacting with the user of the communication device 101. The second authorization request message comprises a cryptogram data field. The cryptogram data field comprises the cryptogram (i.e., the cryptogram that was generated in the first transaction) or no cryptogram. The cryptogram data field in the second authorization request message does not contain a new cryptogram, since the user communication device 101 did not initiate the second transaction.

Further, in steps S130 and S132, the resource provider computer 110 transmits the second authorization request message to the processing computer 120 via the transport computer 115. In step S134, the processing computer 120 analyzes the authorization request message and determines that the cryptogram data field contains the cryptogram or no cryptogram, and allows the second transaction to proceed, even though the cryptogram data field contains the cryptogram or no cryptogram, and does not contain a new cryptogram. Upon determining that the cryptogram data field contains an invalid cryptogram or no cryptogram, the processing computer can search its database to determine if the resource provider identifier and/or the token is associated with a resource provider initiated transaction indicator in the database. In some embodiments, the processing computer 120 can compare a resource provider identifier and other data such as an acquirer BID (bank ID), and a card acceptor ID, in the second authorization request message with the data in the database at the processing computer 120. The data in the database may include data such as the resource provider identifier and the other data stored along with an indication that any transactions submitted with the resource provider identifier will be treated as a resource provider initiated transaction (e.g., a merchant imitated transaction). After the processing computer 120 determines that the second transaction is a resource provider initiated transaction, in step 135, processing computer 120 can obtain the real account identifier for the token by communicating with the token computer 130.

If the transaction was not a recurring transaction, the second transaction would be declined as a new cryptogram needs to be obtained for every transaction. In conventional systems, cryptograms would only be generated if the user of the user communication device 110 specifically interacted in the transaction. However, in embodiments of the invention, the processing computer 120 was previously informed that the resource provider computer would be submitting future transactions that are not initiated by the user of the user communication device 110.

In step S136, the authorization request message comprising the real account identifier is transmitted to the authorizing entity computer 140. In step S140, the authorizing entity computer 140 generates and transmits an authorization response message. Steps S136, and S140 may be similar to steps S118 and S120.

In step S141, the processing computer 120 communicates with the token computer 130 to exchange the real account identifier for the token. In step S142, the processing computer 120 then modifies the authorization response message to include the token instead of the real account identifier. In step S144, the processing computer 120 transmits the authorization response message to the transport computer 115. In step S146, the transport computer 115 transmits the authorization response message to the resource provider computer 110. In step S148, after the authorization response message is received by the resource provider computer 110, and at a later point in time, a clearing and settlement process can occur between the transport computer 115 and the authorizing entity computer 140.

In some embodiments, the processing computer 120 may continue to accept transactions with the same cryptogram or without any cryptogram in the cryptogram data field in the authorization request message for any suitable predetermined period of time (e.g., 3 months).

Embodiments of the invention have a number of advantages. For example, one advantage of this approach compared to conventional solutions is that embodiments minimize changes to a merchant/acquirer infrastructure, since transaction identifiers need not be re-submitted with every recurring transaction. Embodiments also minimize resource provider opportunities to "cheat," by requiring them to have their users initially initiate transactions to obtain authentic cryptograms for initial transactions. Also, embodiments of the invention use tokens that protect real credentials during transactions, and the use of cryptograms can restrict the use of tokens in certain domains to further improve security relative to conventional payment transactions.

Figure 2:
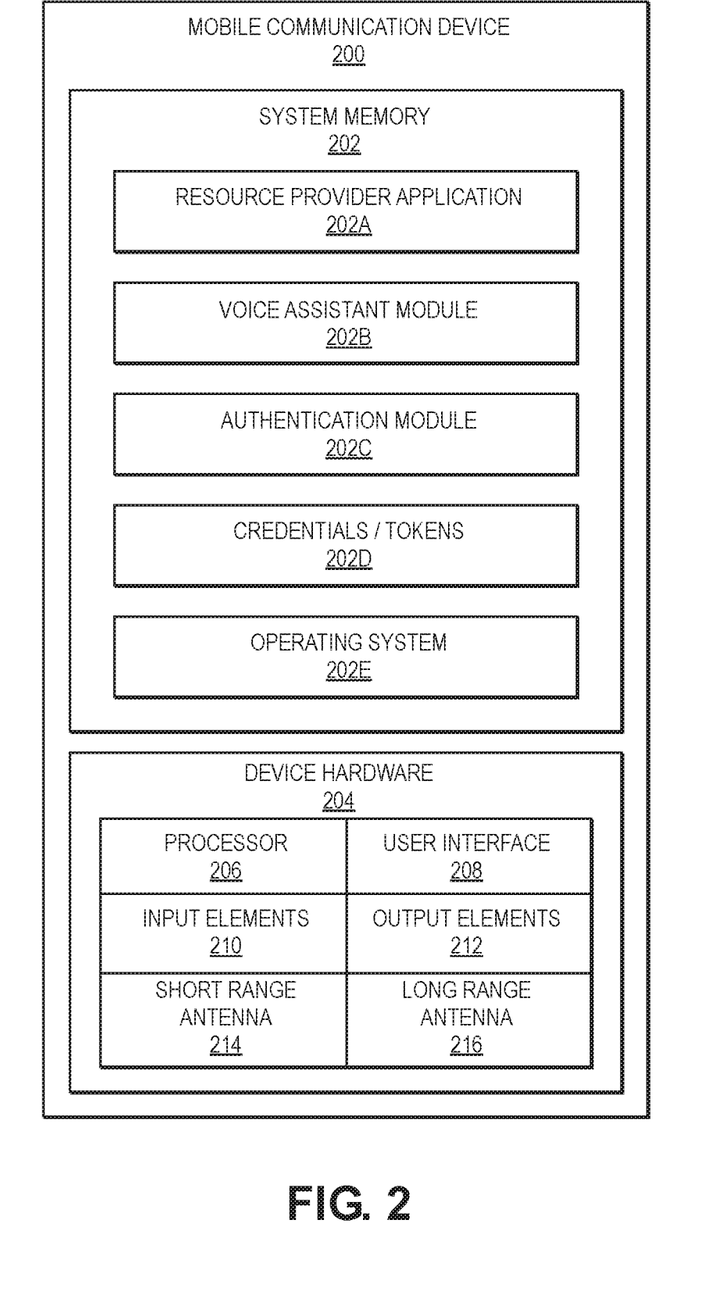
FIG. 2 shows a block diagram of a communication device according to an embodiment.

FIG. 2 shows a block diagram of a communication device according to an embodiment. Mobile communication device 200 may include device hardware 204 coupled to a system memory 202.

Device hardware 204 may include a processor 206, a short range antenna 214, a long range antenna 216, input elements 210, a user interface 208, and output elements 212 (which may be part of the user interface 208). Examples of input elements may include microphones, keypads, touchscreens, sensors, etc. Examples of output elements may include speakers, display screens, and tactile devices. The processor 206 can be implemented as one or more integrated circuits (e.g., one or more single core or multicore microprocessors and/or microcontrollers), and is used to control the operation of mobile communication device 200. The processor 206 can execute a variety of programs in response to program code or computer-readable code stored in the system memory 202, and can maintain multiple concurrently executing programs or processes.

The long range antenna 216 may include one or more RF transceivers and/or connectors that can be used by mobile communication device 200 to communicate with other devices and/or to connect with external networks. The user interface 208 can include any combination of input and output elements to allow a user to interact with and invoke the functionalities of mobile communication device 200. The short range antenna 214 may be configured to communicate with external entities through a short range communication medium (e.g. using Bluetooth, Wi-Fi, infrared, NFC, etc.).

The system memory 202 can be implemented using any combination of any number of non-volatile memories (e.g.,
flash memory) and volatile memories (e.g. DRAM, SRAM), or any other non-transitory storage medium, or a combination thereof media.

The system memory 202 may also store a resource provider application 202A, a voice assistant module 202B, an authentication module 202C, credentials and/or tokens 202D, and an operating system 202E.

The resource provider application 202A may be an application for a resource provider. The resource provider application 202A (or an associated resource provider application server computer) may be used to conduct recurring transaction such as recurring payments in some instances.

The voice assistant module 202B may, in conjunction with the processor 206, allow the user to provide voice commands to the mobile communication device 200. The authentication module 202C may, in conjunction with the processor 206, authenticate the user of the communication device 200 in any suitable manner (e.g., using passwords).

System memory 202 may also store credentials and/or tokens 202D. Credentials and/or tokens 202D may include information identifying the mobile communication device 200 and/or the user of the mobile communication device 200. Examples of credentials may include a public key associated with the mobile communication device 200 and/or a user of the mobile communication device 200, a digital signature (e.g., the public key of the mobile communication device 200 signed by a key of the authentication system), payment credentials such as PANs or biometric data (e.g., biometric samples or templates), etc.

Figure 3:
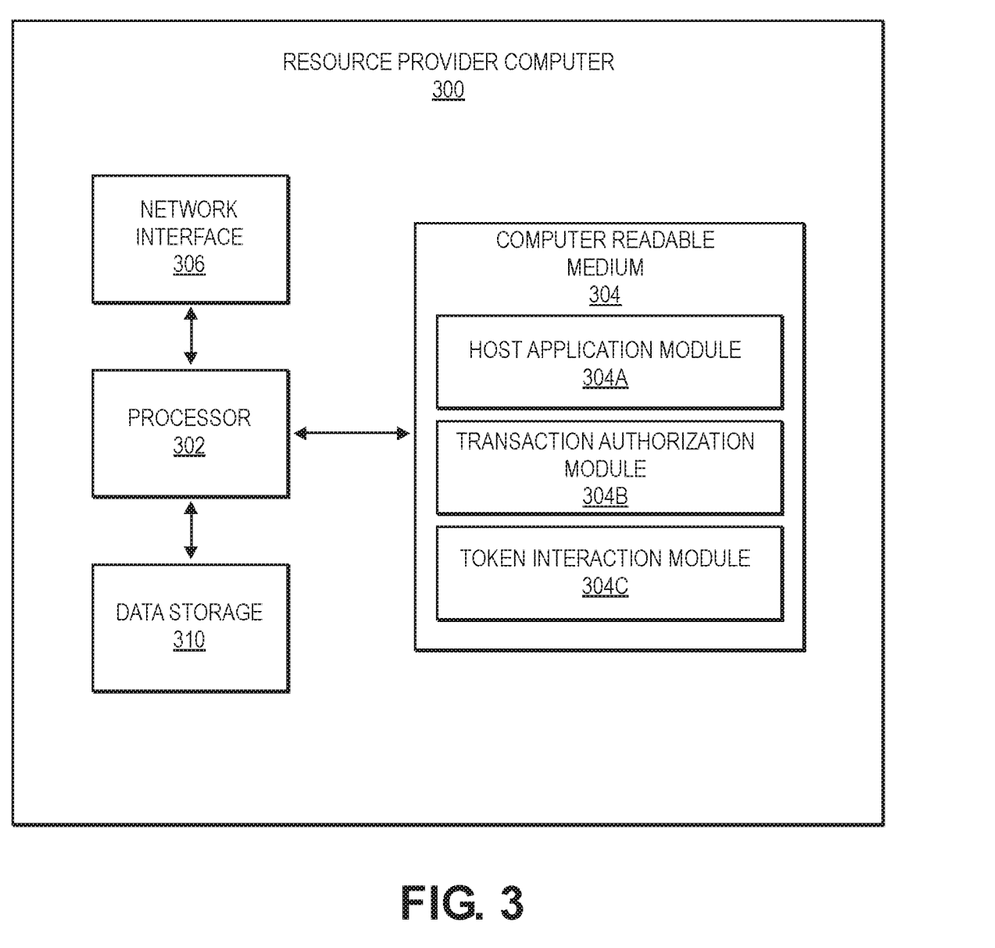
FIG. 3 shows a block diagram of a resource provider computer according to an embodiment.

FIG. 3 shows a block diagram showing components in an exemplary resource provider computer 300. The resource provider computer 300 may comprise a processor 302. It may also comprise a computer readable medium 304, a network interface 306 and data storage 310 operationally coupled to the processor 302.

The computer readable medium 304 may store code or instructions for allowing access device 300 to operate in the manner described herein. The instructions may cause the processor 302 to perform a method including: receiving, by a resource provider computer, a communication comprising a real credential from a communication device; providing, by the resource provider computer, the real credential to a token computer, wherein the token computer obtains a token and a cryptogram, wherein the cryptogram is formed using a resource provider initiated transaction indicator; receiving, by the resource provider computer from the token computer, the token and the cryptogram; transmitting, by the resource provider computer to a processing computer, an authorization request message comprising the token, the cryptogram, a resource provider identifier, and a transaction amount for a first transaction, wherein the processing computer validates the cryptogram, exchanges the token for the real credential, stores the resource provider identifier, and forwards the authorization request message including the real credential, and the transaction amount to an authorizing entity computer; and receiving, by the resource provider computer, an authorization response message from the authorizing entity computer The computer readable medium 304 may further comprise a host application module 304A, a transaction authorization module 304B, and a token interaction module 304C.

The host application module 304A may be an application that interfaces with an application on the communication device. In some embodiments, the host application module 304A may be a Web service application or other application that can initiate transactions on behalf of a user.

The transaction authorization module 304B may, in conjunction with the processor 302, generate and/or transmit authorization request messages, and receive authorization response messages.

The token interaction module 304C may, in conjunction with the processor 302, interact with a token computer to obtain cryptograms or tokens. The token interaction module 304C may in some cases include an API that is associated with the token computer.

The network interface 306 may comprise any suitable hardware or software that can allow the token computer 300 to communicate with external entities. Some examples of network interfaces may include a modem, a physical network interface (such as an Ethernet card or other Network Interface Card (NIC)), a virtual network interface, a communications port, a Personal Computer Memory Card International Association (PCMCIA) slot and card, or the like.

Figure 4:
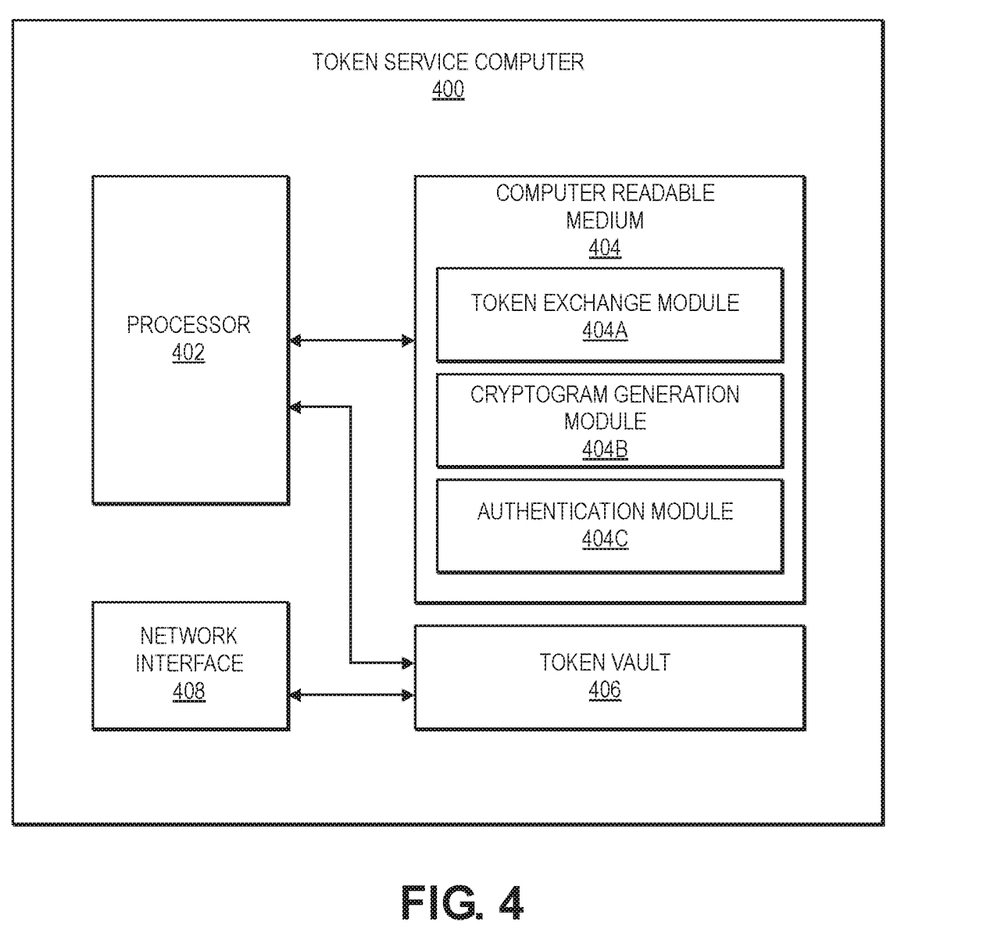
FIG. 4 shows a block diagram of a token computer according to an embodiment.

FIG. 4 shows a token computer 400. The token computer 400 includes a processor 402 and a computer readable medium 404, a token vault 406, and a network interface 408 coupled to the processor 402.

The computer readable medium 404 may comprise code, executable by the processor 402 to perform a method including: receiving, by a token computer, a communication comprising a real credential from a communication device for a transaction conducted with a resource provider computer; obtaining, by the token computer, a token and a cryptogram, wherein the cryptogram is formed using a resource provider initiated transaction indicator; receiving, by the token computer, a request to exchange the token for the real credential from a processing computer; and transmitting, by the token computer, a response including the token to the processing computer, wherein the processing computer exchanges the token with the real credential in an authorization request message from the resource provider computer, the authorization request message including the real credential and a transaction amount, and processes the authorization request message.

The computer readable medium 404 may comprise a token exchange module 404A, a cryptogram generation module 404B, and an authentication module 404C.

The token vault 406 may store tokens and their associated credentials in a database. Other data that may be present in the token value 406 may include restrictions on the use of tokens, cryptograms, etc. The token vault 406 may store data in a database such as an Oracle™ database.

The tokenization exchange module 404A may comprise code that causes the processor 402 to provide tokens for real credentials or vice-versa. For example, the token exchange module 404A may contain logic that causes the processor 402 to receive a real credential, search the token vault 406, and return a token. It may also contain logic that causes the processor 402 to receive a token, search the token vault 406, and return a real credential.

The cryptogram generation module 404B may comprise code that causes the processor 402 to generate cryptograms for tokens. The generation of cryptograms is described above.

The authentication module 404C may comprise code that causes the processor 402 to authenticate communication devices, users, processor computers, etc. to verify their ability to receive certain data such as tokens or cryptograms. In some embodiments, the authentication module 404C, in conjunction with the processor 402, may verify device identifiers or IP addresses associated with communication devices to ensure that they are authentic. It may also verify user credentials such as passwords or secrets to ensure that the user that is using a particular communication device is legitimate.

Figure 5:
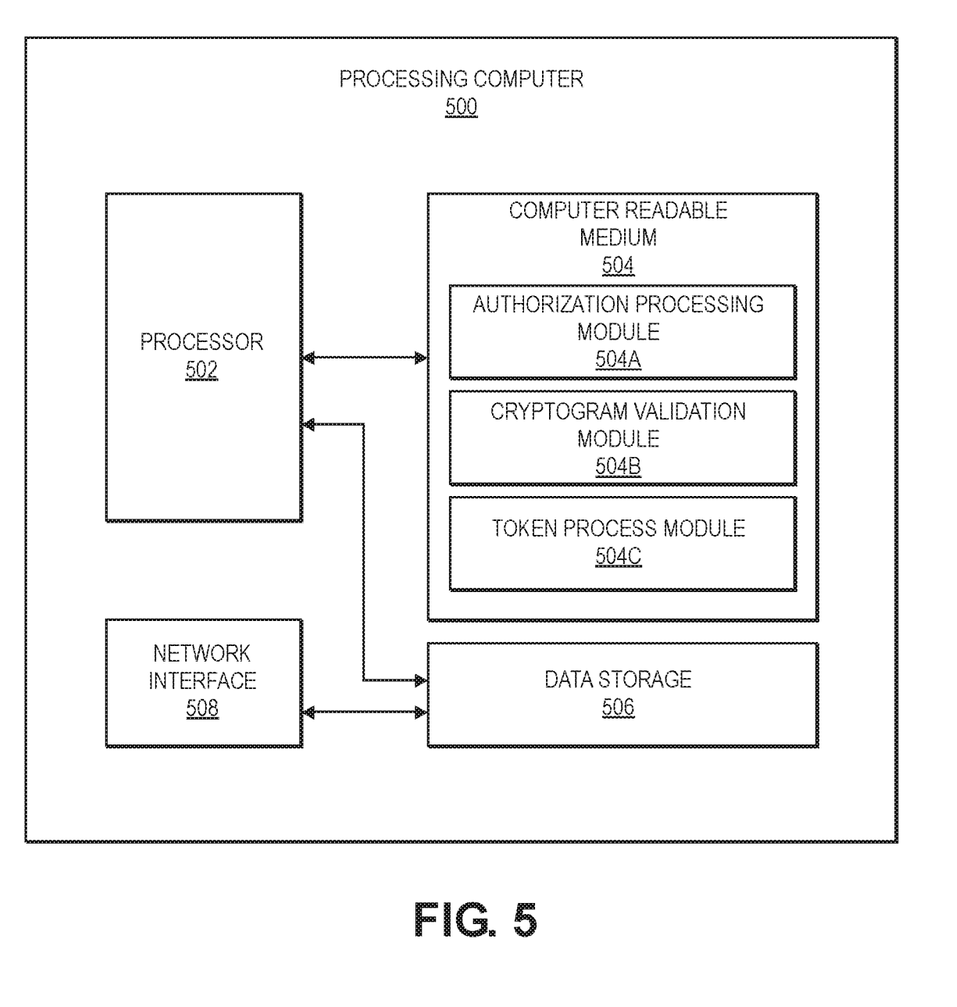
FIG. 5 shows a processing computer according to an embodiment.

FIG. 5 shows a block diagram of a processing computer 500 according to an embodiment. The processing computer 500 may comprise a processor 502, which may be coupled to a computer readable medium 504, data storage 506, and a network interface 508. The data storage 506 may contain access data such as tokens and/or account data, as well as mappings between access data, credentials, and/or communication device identifiers such as phone numbers, IP addresses, device identifiers, etc.

The computer readable medium 504 may comprise a number of software modules including an authorization processing module 504A, a cryptogram validation module 504B, and a token process module 504C. The computer readable medium may also comprise a clearing and settlement module (not shown).

The authorization processing module 504A may comprise code that can cause the processor 502 to evaluate authorization request messages for transactions and determine if the transactions should be authorized. The authorization processing module 504A may also include code for routing or modifying authorization request and response messages as they pass between various parties such as authorizing entity computers (e.g., issuer computers) and transport computers (e.g., acquirer computers).

The cryptogram validation module 504B may include a module that can validate cryptograms. Suitable data encryption/decryption algorithms may include DES, triple DES, AES, etc. It may also store encryption keys that can be used with such encryption/decryption algorithms. The cryptogram module 504B may utilize symmetric or asymmetric encryption techniques to encrypt and/or verify data. Cryptographic keys that may be used by the cryptogram module 504B may be securely stored in the data storage 506. Cryptogram validation processes are further described above.

The token process module 504C may comprise code that causes the processor 502 to communicate with the token computer, as described above.

In some embodiments, the processing computer 500 may be in a payment processing network and may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, by a resource provider computer, a communication comprising a real credential from a communication device;
providing, by the resource provider computer, the real credential to a token computer, wherein the token computer obtains a token and a cryptogram, wherein the cryptogram is formed using a resource provider initiated transaction indicator;
receiving, by the resource provider computer from the token computer, the token and the cryptogram;
transmitting, by the resource provider computer to a processing computer, a first authorization request message comprising the token, the cryptogram, a resource provider identifier, and a first transaction amount for a first transaction, wherein the processing computer validates the cryptogram, exchanges the token for the real credential, stores the resource provider identifier, and forwards the first authorization request message including the real credential, and the first transaction amount to an authorizing entity computer;
receiving, by the resource provider computer, an authorization response message from the authorizing entity computer;
generating, by the resource provider computer, a second authorization request message comprising the token, a second transaction amount for a second transaction, and the resource provider identifier, without interacting with the communication device for the second transaction, wherein the second authorization request message comprises a cryptogram data field, the cryptogram data field comprising no cryptogram; and
transmitting, by the resource provider computer, the second authorization request message to the processing computer, wherein the processing computer analyzes the second authorization request message and determines that the cryptogram data field contains no cryptogram and allows the second transaction to proceed even though the cryptogram data field contains no cryptogram.

2. The method of claim 1, wherein the second transaction is a recurring transaction.

3. The method of claim 1, wherein allowing the first transaction to proceed includes exchanging the token for the real credential in the second authorization request message, and transmitting the second authorization request message comprising the real credential and the second transaction amount to the authorizing entity computer for authorization, even though the cryptogram data field contains no cryptogram.

4. The method of claim 1, wherein the cryptogram is formed by encrypting data including the resource provider initiated transaction indicator and additional data using a cryptographic key that is shared with the processing computer.

5. The method of claim 4, wherein the additional data comprises the real credential or a portion thereof.

6. The method of claim 1, wherein the token and the real credential are in similar formats and have the same length.

7. A computer comprising:
a processor; and
a computer readable medium coupled to the processor, the computer readable medium comprising code, executable by the processor, for implementing a method comprising:
receiving a communication comprising a real credential from a communication device;
providing the real credential to a token computer, wherein the token computer obtains a token and a cryptogram, wherein the cryptogram is formed using a resource provider initiated transaction indicator;
receiving, from the token computer, the token and the cryptogram;
transmitting, to a processing computer, a first authorization request message comprising the token, the cryptogram, a resource provider identifier, and a first transaction amount for a first transaction, wherein the processing computer validates the cryptogram, exchanges the token for the real credential, stores the resource provider identifier, and forwards the first authorization request message including the real credential, and the first transaction amount to an authorizing entity computer;
receiving an authorization response message from the authorizing entity computer;
generating a second authorization request message comprising the token, a transaction amount for a second transaction, and the resource provider identifier without interacting with the communication device for the second transaction, wherein the second authorization request message comprises a cryptogram data field, the cryptogram data field containing no cryptogram; and
transmitting the second authorization request message to the processing computer, wherein the processing computer analyzes the second authorization request message and determines that the cryptogram data field contains the cryptogram included in the first authorization request message or no cryptogram, and allows the second transaction to proceed, even though the cryptogram data field contains no cryptogram.

8. The computer of claim 7, wherein the second transaction is a recurring transaction.

9. The computer of claim 7, wherein the cryptogram is formed by encrypting data including the resource provider initiated transaction indicator and additional data.

10. The computer of claim 7, wherein the cryptogram is formed by encrypting data including the resource provider initiated transaction indicator and additional data using a cryptographic key that is shared with the processing computer.

11. A method comprising:
receiving, by a token computer, a communication comprising a real credential from a communication device for a first transaction conducted with a resource provider computer,
obtaining, by the token computer, a token and a cryptogram, wherein the cryptogram is formed using a resource provider initiated transaction indicator;
receiving, by the token computer, a request to exchange the token for the real credential from a processing computer;
transmitting, by the token computer, a response including the token to the processing computer, wherein the processing computer exchanges the token with the real credential in a first authorization request message from the resource provider computer, the first authorization request message including the real credential and a first transaction amount, and processes the first authorization request message;
receiving, by the token computer, a second request to exchange the token for the real credential from the processing computer; and
transmitting, by the token computer, the real credential to the processing computer, which exchanges the token with the real credential in a second authorization request message from the resource provider computer, the second authorization request message including a cryptogram data field that contains no cryptogram, and processes the second authorization request message.

12. The method of claim 11, wherein the processing computer processes the authorization request message by transmitting the authorization request message to an authorizing entity computer.

13. The method of claim 11, further comprising,
receiving, by the processing computer, the first authorization request message comprising the token, the first transaction amount, and the cryptogram in a cryptogram data field.

14. The method of claim 13, further comprising:
validating, by the processing computer, the cryptogram.

15. The method of claim 13, wherein the method further comprises:
receiving the second authorization request message, wherein the second authorization request message comprises the cryptogram data field for the second transaction, the cryptogram data field containing no cryptogram; and
analyzing the second authorization request message and determining that the cryptogram data field contains no cryptogram, and allowing the second transaction to proceed, even though the cryptogram data field contains no cryptogram.

16. The method of claim 15, wherein allowing the transaction to proceed includes exchanging the token for the real credential in the second authorization request message, and transmitting the second authorization request message comprising the real credential and the second transaction amount to the authorizing entity computer for authorization, even though the cryptogram data field contains no cryptogram.

17. The method of claim 11, wherein the communication device is a mobile phone comprising a resource provider application associated with the resource provider computer.

18. The method of claim 1, wherein responsive to determining that the cryptogram data field comprises no cryptogram, the processing computer is configured to retrieve the stored resource provider identifier and the token in a database, and wherein the processing computer allows the second transaction proceed responsive to determining that the stored resource provider identifier and/or the token is associated with the resource provider initiated transaction indicator.

* * * * *